Patented Oct. 1, 1935

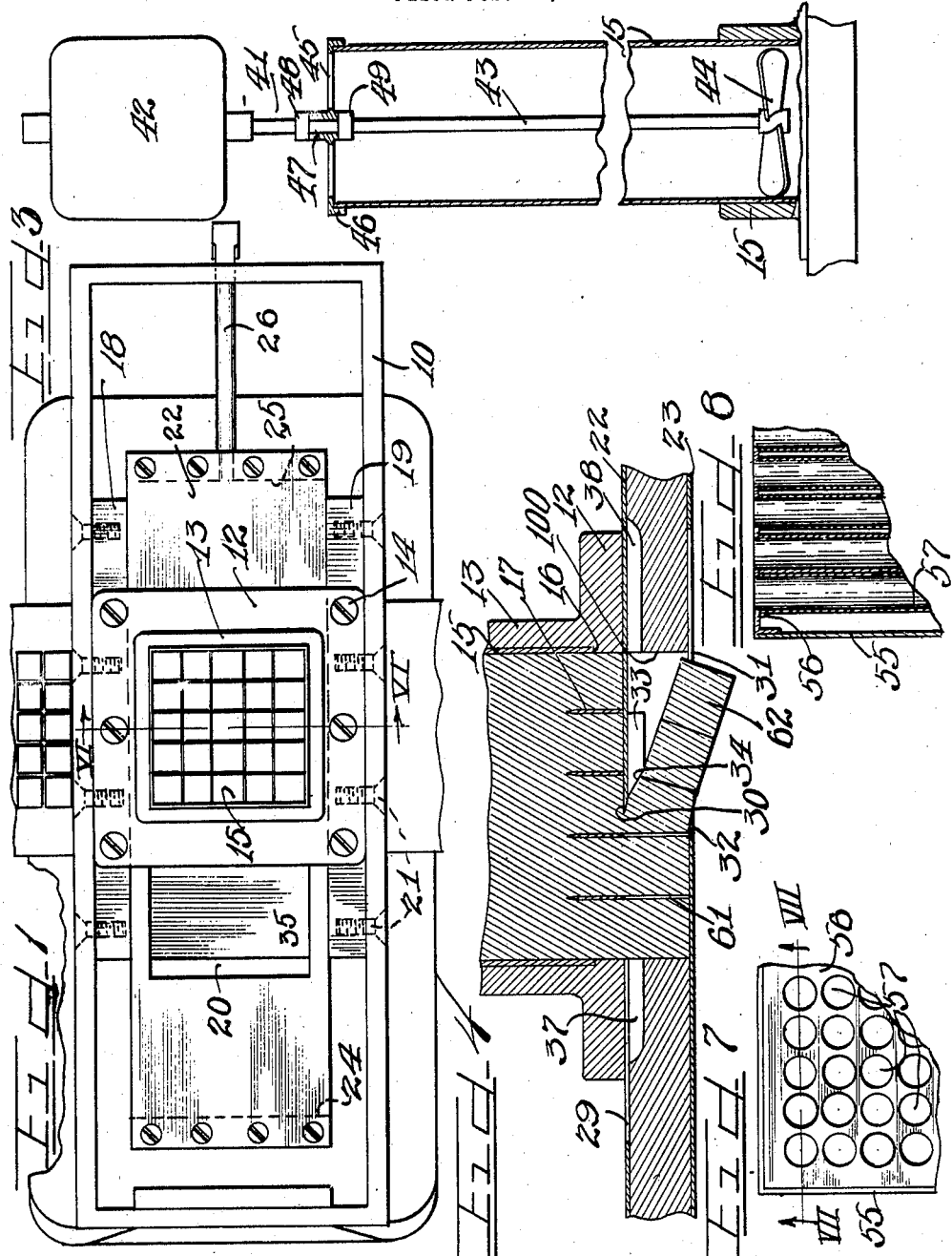

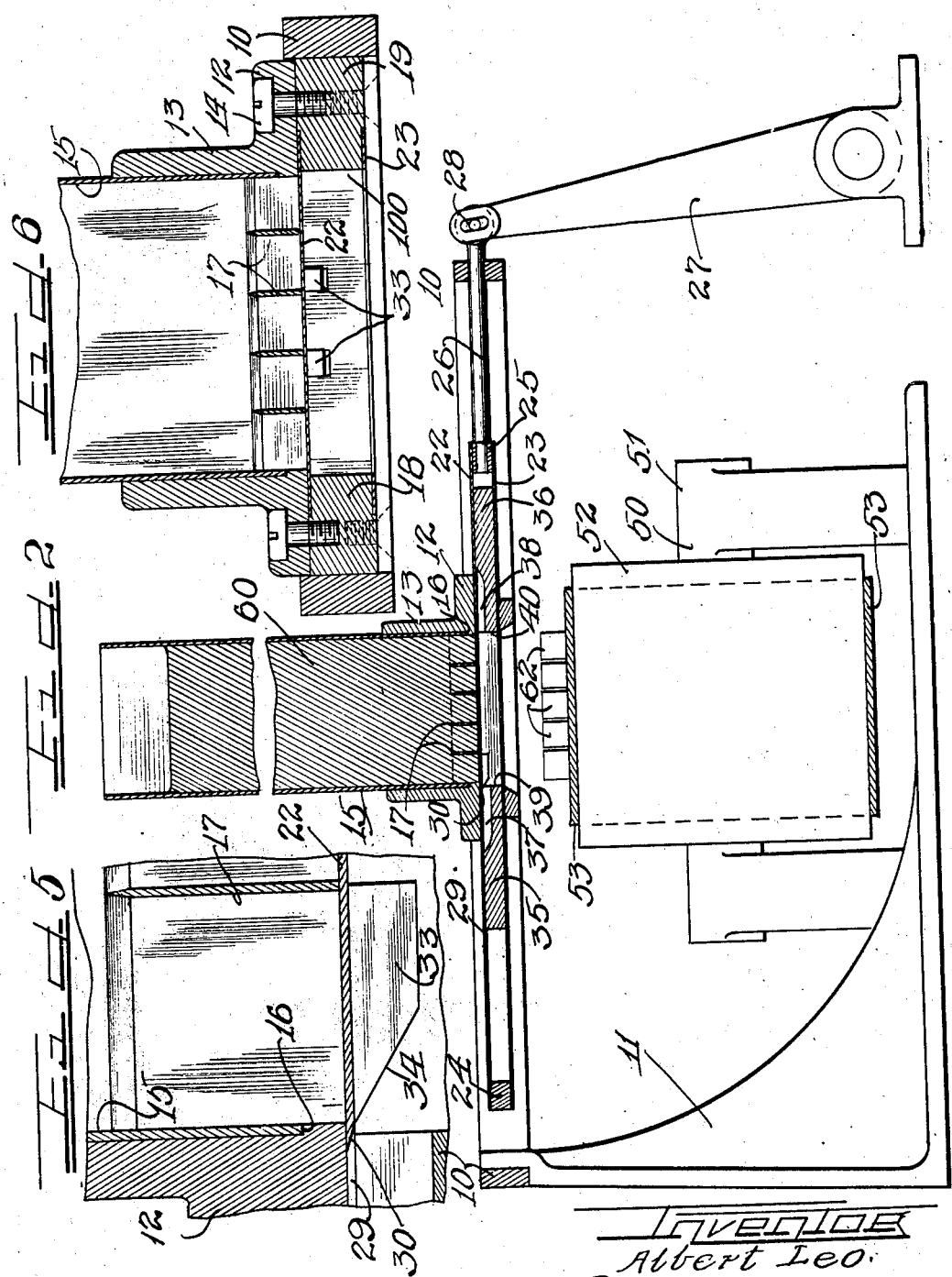

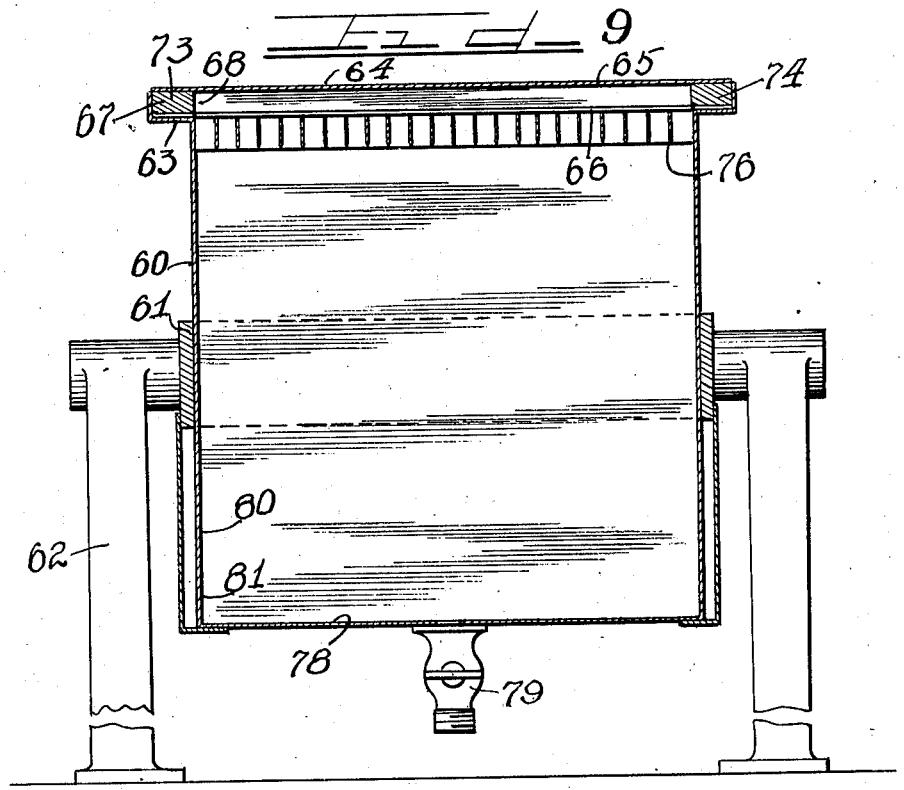
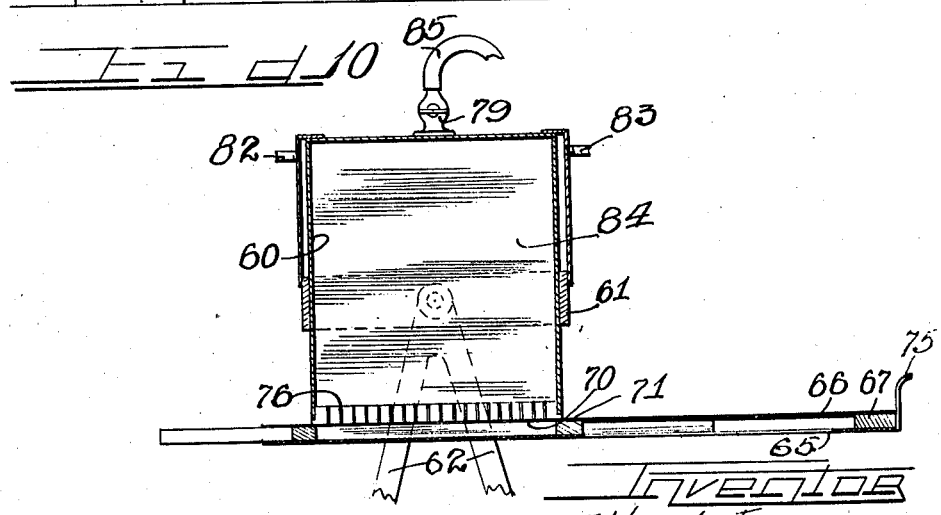

2,015,857

UNITED STATES PATENT OFFICE 2,015,857

APPARATUS FOR AND PROCESS OF PREPARING A JELLY PRODUCT

Albert Leo, Chicago, Ill.

Application February 15, 1933, Serial No. 656,811

8 Claims. (Cl. 107—14)

This invention relates to an apparatus for and a method of preparing a jelly product. More particularly, the invention relates to the preparation of jelly-like products in special form for use in confectioneries, such as in ice cream, in gum drops, and the like.

Heretofore, it has been customary to mold jelly in individual forms of the desired ultimate size and shape. For instance, in the manufacture of gum drops, the individual gum drops are first molded in starch molds. This necessitates the handling of a lot of individual trays and requires a complicated set of machinery.

According to my present invention, the jelly-like substance is initially molded in a long vertical tubular receptacle, which may have any desired cross sectional shape and which has smooth inner walls. The liquid ingredients of the jelly preparation may be introduced into the tubular receptacle and then an agent added adapted to cause the mass to set into a semi-solid, jelly-like substance. After being completely set, the jelly can be moved within the receptacle as a mass, like a piston, because of the smooth wall surfaces. The jelly-like mass is then allowed or caused to pass out of the lower opened end of the tubular receptacle and as it does so, it is subdivided and sliced into the desired shapes or forms.

It is therefore an object of this invention to provide an apparatus for the preparation of jelly-like products which is of simple construction and capable of preparing large quantities of the jelly-like product in desired forms and shapes without the use of individual molds.

It is a further object of this invention to provide a method for the preparation of jelly-like products whereby a large quantity of the principal ingredients can be prepared in advance in a liquid form and the liquid mass can be readily set into a single, large semi-solid mass and directly subdivided into the desired shapes or forms.

It is a further important object of this invention to provide a method for preparing diced jelly-like candies and the like, wherein the jellying ingredients can be handled in large quantities in a cold state and an agent added thereto to set the mass into a semi-solid, jelly-like condition within a comparatively short time and the jelly-like mass then directly subdivided into dices or other small shapes or forms.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of apparatus embodying the principles of my invention.

Figure 2 is a broken, cross sectional view, taken substantially along the line II—II of Figure 1.

Figure 3 is a broken, longitudinal sectional view of the tubular receptacle illustrating the use of a removable agitator therein.

Figure 4 is an enlarged, fragmentary sectional view illustrating the operation of the cutting device.

Figure 5 is an enlarged, fragmentary sectional view of the cutting mechanism.

Figure 6 is an enlarged sectional view taken substantially on line VI—VI of Figure 1.

Figure 7 is a top plan view of a modified form of receptacle for containing the jelly-like mass.

Figure 8 is a fragmentary sectional view taken substantially along line VIII—VIII of Figure 6.

Figure 9 is a side elevational view of a modified form of my invention, with parts in section.

Figure 10 is a sectional view taken substantially along the line X—X of Figure 9 on a reduced scale and with the receptacle inverted.

As shown on the drawings:

The reference numeral 10 (Figs. 1 to 6 incl.) indicates a supporting frame suitably mounted upon a stand 11 from one end thereof. A plate 12 having an upstanding flanged wall 13 defining an opening therethrough is positioned centrally upon the frame 10 and secured thereon. An open ended, tubular receptacle 15 is removably secured within the opening to the upstanding flange 13, which is recessed as at 16 to receive it. A plurality of spaced knives 17, which may be arranged in criss cross fashion at right angles to each other, are fixedly supported from the tubular receptacle 15 adjacent the lower edge thereof. The receptacle 15, which is shown rectangular, in cross section is relatively deep as compared with its other dimensions.

The frame 10 is provided with longitudinally extending guideways 18 and 19, spaced apart to provide an opening 20 extending substantially the full length of said frame 10. Said guideways 18 and 19 are secured to the longitudinally extending portions of the frame 10 by means of bolts 21 (Fig. 1). The plate 12 is secured to said guideways by bolts 14.

A pair of upper and lower spaced plates 22 and 55

23, respectively, are mounted for reciprocation on said guideways 18 and 19. Said plates are secured together at their extremities by means of spacer bars 24 and 25, to the latter of which is secured a rod 26 through which reciprocatory motion is effected by means of a rocker arm 27 having an upper slotted end 28 for receiving the free end of said bar 26.

The upper plate 22 is slotted, as at 29, for approximately the width of the tubular receptacle 15 and one edge of said slot is beveled to form a knife edge, as at 30. The lower plate 23 is likewise provided with a slot 31 of substantially the dimensions of the cross section of the tubular receptacle 15 and this slot is so positioned with respect to the knife edge 30 that its forward edge 32 is slightly in advance of the knife edge 30 as the two plates are reciprocated forwardly on the cutting stroke.

On the underside of the plate 22, adjacent the knife edge 30, are positioned a plurality of blocks 33 having beveled edges 34 forming substantially a continuation of the beveled edge 30 but of deeper angle. The guideways 18 and 19 form the longitudinally extending portions of a stationary apertured plate having transverse strips 35 and 36, which extend between the spaced plates 22 and 23 on each side of an opening 100 at the bottom of the receptacle 15. Said strips 35 and 36 are provided with slots or cut away portions 37 and 38, respectively, to permit movement of the blocks 33 beyond the transverse edges of said opening 100 defined by the edges 39 and 40 of said strips.

A removable agitating device, indicated as a whole by the reference numeral 41 is adapted to be mounted on the tubular receptacle 15. Said agitating device 41 comprises a motor 42 having a shaft 43 connected thereto, which is provided at its lower end with a propellor blade type of agitator 44. A spider 45 having peripherally extending flanges 46 for supporting the device on the upper end of the receptacle 15 is secured to said shaft 43 by means of its hub 47 and a pair of fixed washers or collars 48 and 49. The hub 47 forms a bearing for the shaft 43 and the fixed collars 48 and 49 hold the shaft in position within said bearing.

A conveying device, indicated as a whole by the reference numeral 50, may be suitably positioned beneath the opening at the lower end of the receptacle 15. Said conveying device 50 comprises a plurality of end supports 51 between which are mounted drums 52, one of which may be suitably driven. A conveyor belt 53 is looped around said end drum 52 and is caused to travel by rotation of one of said drums beneath the opening of the tubular receptacle 15.

Instead of a single tubular receptacle 15 of rectangular cross section, a receptacle provided with a plurality of cylindrical tubes, as shown in Figures 7 and 8, may be used. The receptacle there indicated comprises side walls 55 to which apertured plates 56 are suitably affixed at the top and bottom. Vertical tubes 57 are arranged in spaced relation corresponding with the apertures of said end plates 56.

In the modified form of my invention illustrated in Figures 9 and 10, there is shown a receptacle 60 rotatably mounted upon horizontal trunnions 61 supported in bearing standards 62 at each end. The receptacle 60, as before, may be of rectangular or other cross sectional shape but must be of uniform cross sectional dimension and have relatively smooth and preferably polished inner walls. At one end of the receptacle, the side walls are provided with an outwardly extending peripheral flange 63 to which may be removably secured a cutting element indicated as a whole by the reference numeral 64.

Said cutting element 64 comprises a pair of spaced plates 65 and 66, spaced apart by means of a plate 67 which has an opening 68 registering with the open end of said receptacle 60. The plate 66, which is the one nearest the open end of the receptacle 60, is provided with an opening 70 of the same size and shape as the opening of the receptacle and one of said edges defining said opening is beveled to provide a knife edge as at 71. Similarly, the other plate, 65, is provided with an opening 72 of the same size which lies just behind the opening 70 on the cutting stroke of the knife 71. Strips 73 and 74, forming part of the plate 67, serve as guideways for the plates 65 and 66 during the reciprocation of the knife 71. Said plates 65 and 66 are of a length in the direction of their movement more than twice the dimension of the receptacle and may be provided, as above described, with a reciprocating mechanism, or as here shown, with a handle 75 for manual reciprocation.

A grid 76 of knives arranged in criss cross fashion may be either fixedly or removably secured in the open end of the receptacle. Preferably, the grid 76 is made removable with the cutting attachment.

The end of the receptacle opposite the open end to which the cutting attachment is affixed, is closed by an end wall 78, which is provided with a valve fitting 79 that opens into said receptacle. Said fitting 79 serves a purpose that will later be more fully described. The receptacle adjacent the end wall 78 is provided with a spaced side wall 80 continuous therearound to provide a chamber 81 into which either a heating or cooling medium may be introduced, as by means of the inlet and outlet pipes 82 and 83, respectively. Suitable flexible connections, not shown, may be used to connect the chamber 81 with a source of a heating fluid, such as steam or hot water, or a cooling fluid, such as water or brine. The provision of the jacket 80 makes it possible therefore to use the receptacle 60 either as a kettle in which to make up the jelly preparation or simply as a receptacle in which to cool and set the jellying ingredients when introduced as a preformed mix.

In operation, using the device shown in Figures 1 to 6, inclusive, a liquid mass of the jellying constituents is made up and poured into the receptacle 15, preferably in a cold state. For instance, all of the necessary ingredients of a jelly with the exception of the acid or other setting agent may be mixed together and brought to the proper concentration and then cooled and charged into the receptacle 15. As a specific example, these liquid ingredients would include, in aqueous solution, the necessary quantities of pectin, sugar and flavoring material to make a jelly upon the addition of acid. In the absence of the acid, the solution will not set to a jelly but may be kept indefinitely. This is of considerable advantage in handling, since the solution can be run through pipes or hose from a central storage receptacle as required.

After the pectinized sugar syrup has been run into the receptacle 15, the agitating device 41 is set up in position and the requisite amount of acid, preferably in aqueous solution, is added to the mass and the mass agitated vigorously for a sufficient length of time to mix the acid uniformly throughout the mass. The agitating device is then removed before the mass has a chance to set. The mass sets rapidly in a very few minutes to a semi-solid consistency.

Obviously, during the time of filling the receptacle 15, the plates 22 and 23 are moved into position such that the plate 22 closes the lower opening of the tubular member 15, as shown in Figure 2. After the mass 60 has set within the receptacle 15, the reciprocating mechanism is started in motion. As the plate 22 is withdrawn from beneath the receptacle 15, the opening 29 in said plate permits the mass of jelly to move by gravity down past the open end of the receptacle 15 until it rests upon the lower plate 23. In thus moving down, the stationary knives 17 of the grid at the bottom of the receptacle 15 serve to cut the mass 60 lengthwise of said receptacle, as shown at 61 (Fig. 3).

After the plates 22 and 23 have reached their extreme positions in one direction and the mass 60 is resting solidly upon the lower plate 23, movement starts in the other direction. During this latter movement, the knife edge 30 slices the mass 60, as indicated in Figure 4, and the diced portions 62 fall downwardly through the opening 31 in the lower plate 23 onto the conveyer belt 53. The blocks 33 with their forward beveled edges 34 aid in separating the diced portions 62 from the lower edge of the knife 30. The action of these blocks 33 is to admit air between the severed mass of jelly and the under surface of the plate 22 adjacent the knife edge 30, and thus prevent the jelly from sticking to said under surface.

It is obvious that the movement of the conveyer belt 53 may be a step by step movement in synchronism with the reciprocatory movement of the cutting mechanism, so that each series of diced portions 62 may be properly positioned as the belt moves along.

In using the type of receptacle indicated in Figures 7 and 8, the action is substantially the same except that there need be no fixed knives for dividing the jelly masses longitudinally of the tubes. It is obvious that the tubes may be of any desired cross section, such as heart or diamond shaped.

The mode of operation of the modified form of my invention illustrated in Figures 9 and 10 is somewhat different from that described above. In this case, the cutting attachment 64 is first removed from the receptacle 60 and with the receptacle in the position illustrated in Figure 9, the jellying ingredients are run in to the receptacle through the upper open end. At this stage, the valve in the fitting 79 is closed. As previously stated, the jellying ingredients may be run into the receptacle 60 in a finished, cold or hot state and allowed to set in the receptacle, or the separate ingredients may be mixed in the receptacle and heated to the desired concentration by means of steam, using the jacketed chamber 81, and then the mass cooled to set the jelly by passing water through the jacketed chamber 81. In either event, the mass is molded directly in the receptacle 60.

After the mass has set, the receptacle 60 is revolved into the position illustrated in Figure 10, with its open end in downward position. The cutting attachment 64 is then affixed to the open end of the receptacle, as shown in Figure 10, except with the plate 65 closing the receptacle. During the rotation of the receptacle, the mass of jelly 84 will not move but will remain in the jacketed end of the receptacle, owing to the close fit of the jelly mass to the walls of the receptacle and the impossibility of any air getting behind the mass to break the vacuum. After the receptacle has been inverted, however, and the plate 66 positioned so as to close the lower open end of the receptacle, the valve in the fitting 79 is opened to admit air at the top of the jelly mass, which thereupon will normally slide downwardly against the pitch knives 76. If the jelly mass should be of such consistency as not to slide readily, air under sufficient pressure is introduced through a flexible hose 85 connected to the fitting 79 and to a source of compressed air. The jelly mass will thereupon be forced as a single unit down against the grid knives 76.

The cutting operation in connection with the device shown in Figures 9 and 10 will be substantially the same as that previously described, except that the cutting element may be reciprocated manually.

The fact that the jelly mass is formed in a smooth walled receptacle causes the mass to be smooth on the surface that comes in contact with the inner wall of the tube, or receptacle. The jelly mass, therefore, will slide down the receptacle, as permitted, without breaking its structure.

It is much preferable to employ the jelly ingredients in a cold state, since if hot jelly material were poured into the receptacle, it would lose some of its pleasing texture due to the contact of the acid with the pectin and sugar at high temperatures. The temperature to which a mass must be heated in order to form a jelly upon cooling is in the neighborhood of from 217 to 225° F. If such a mass were cooled quickly, the acid would not have sufficient time to hydrolyze the pectin. In the case of large batches, however, the cooling process is necessarily slow enough to effect the texture of the jelly and therefore the aqueous solution of all of the jellying ingredients except the acid is preferably used in a cold state.

It will be understood, however, that the jelly mass may be made directly in the receptacle or may be added thereto in a heated state. The important feature of my invention is that the mass of jelly is initially molded in the receptacle itself.

Apparatus such as described can be suitably used in the kitchen of restaurants and hotels for cutting individually a service of jelly or jam, or for decorating salads and the like with diced jelly preparations. The apparatus can also be used in baker shops for decorating cakes and in candy factories for cutting pectin jellies. It is also contemplated that apparatus of a similar construction can be used by retail candy sellers, either for their own make of jelly products or can be coin operated by the customer to dispense diced candies.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of preparing jelly-like products, which comprises preparing a cold liquid non-jellying mixture, confining said mixture within a mold, adding an agent thereto to set said mixture within said mold and subdividing said molded mixture to the desired shapes as it slides by gravity out of said mold.

2. The method of preparing jelly-like products, which comprises preparing a cold liquid non-jellying mixture, confining said mixture within a mold, adding an agent thereto to set said mixture, agitating said mixture, allowing the mixture to set within said mold and subdividing said molded mixture to the desired shapes as it slides by gravity out of said mold.

3. The method of preparing jelly products, which comprises introducing a cold non-self-jellying pectinized sugar solution into a vertical mold, adding acid to said solution to set the same and subdividing said molded jelly mix as it slides out of said mold.

4. The method of preparing jelly products, which comprises inserting a fluid jellying mixture into an elongated open ended receptacle sealed at the bottom thereof with a removable closure member, allowing the mixture to set into a semi-solid mass, removing said closure member, extruding the mass as an entity through a die to subdivide the mass and cutting the extruded subdivided mass to produce articles of the desired shape.

5. The method of preparing jelly products, which comprises introducing a liquid jellying mixture into an open ended receptacle of uniform cross section sealed at the bottom thereof with a removable closure member, allowing the mixture to congeal, removing said closure member, moving the congealed mass as an entity toward an open end of the receptacle, subdividing said mass as it passes out of said receptacle and cutting the extruded subdivided mass to produce articles of the desired shape.

6. The process of forming jelly products which comprises introducing ingredients suitable for forming the jelly into a receptacle having an open top and being of uniform cross section, heating said ingredients in said receptacle to form a jellying mixture, cooling said mixture to congeal the same, inverting said receptacle, introducing a gas under pressure into said receptacle above the congealed mass therein to move said mass as an entity toward the open end of said receptacle, subdividing said congealed mass as it passes out of said receptacle and cutting said subdivided mass to produce articles of the desired shape.

7. Apparatus for forming jelly products comprising a smooth wall receptacle of uniform cross section having an open top and an opening in the bottom, a valve inserted in said opening, a plurality of knives vertically disposed in spaced relation across the open top of said receptacle, a steam jacket surrounding the bottom portion of said receptacle, means for inverting said receptacle, means associated with said valve to supply a compressed gas to the receptacle to extrude the mass in the receptacle through the knives, a supporting plate in spaced relation from said knives to hold the extruded mass, means above said supporting plate for cutting the extruded mass from the mass in the receptacle and means for moving said supporting plate away from the cut extruded mass to allow the same to drop onto a carrier.

8. Apparatus for forming jelly products comprising a supporting structure, a receptacle having smooth side and bottom walls defining a chamber of uniform cross section and an open top, said receptacle being pivotally mounted in said supporting structure, a valve communicating with the bottom of said receptacle, a steam jacket surrounding the bottom portion of said receptacle, means associated with said valve to supply a compressed gas to the receptacle for extruding a jelly mass therein toward the open end thereof, a supporting plate in spaced relation from the open end of the receptacle adapted to hold the extruded mass, means above said supporting plate for cutting the extruded mass from the mass in the receptacle and means for moving said supporting plate away from the cut extruded mass to allow the same to drop.

ALBERT LEO.